April 7, 1936.  A. S. NEWMAN  2,036,717
MEANS FOR FEEDING STRIP FILMS
Filed July 19, 1934
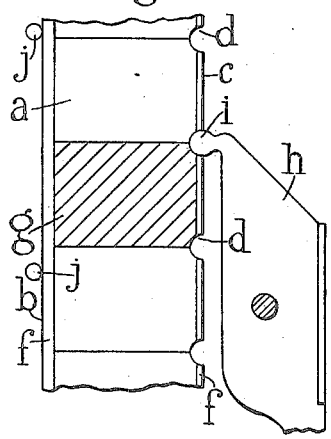
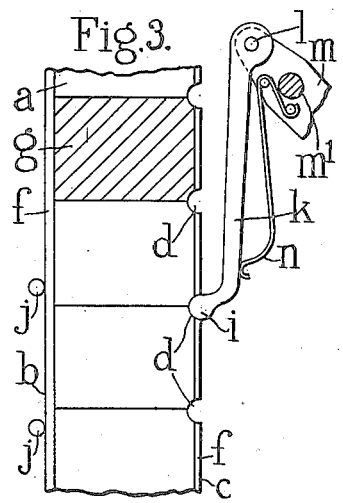
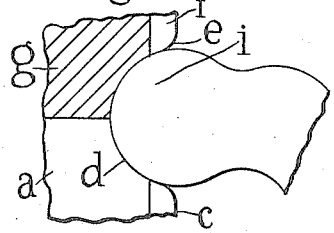
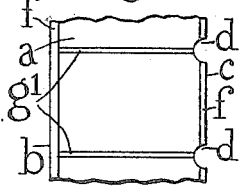

Patented Apr. 7, 1936

2,036,717

UNITED STATES PATENT OFFICE 2,036,717

MEANS FOR FEEDING STRIP FILMS

Arthur Samuel Newman, Highgate, London, England, assignor to Pathescope Limited, London, England Application July 19, 1934, Serial No. 735,916
In Great Britain July 19, 1933

2 Claims. (Cl. 88—18.4)

The object of the present invention is to provide improved means for feeding in a right line a film of that kind having one straight edge and arcuate notches in the opposite edge.

According to the present invention the arcuate end of a single feeding member is located at the side of the notched edge of the film and moves always in the same plane as that in which the film moves through the gate. The claw has a reciprocating longitudinal motion for feeding the film and a motion, transverse to the film, to allow it to enter and leave the notches. As the claw presses the film laterally it is necessary to provide means for guiding the film in a right line on the opposite side to the notches. For this purpose fixed guide pins are employed to guide the film through a distance greater than the distance that the film is fed at each stroke of the feeding member.

The invention is illustrated in the accompanying drawing in which:

Fig. 1 is a front elevation of the improved film and part of a member for driving the same.

Fig. 2 is an enlarged front elevation of part of the improved film and of the end of the driving member drawn to a larger scale than in Fig. 1, and showing a slight modification in the film.

Fig. 3 is a front elevation of a film such as shown in Fig. 1, and of part of another form of member for driving the same.

Fig. 4 is a front elevation of part of a film showing that the pictures may be separated by narrow gaps.

As shown in the drawing the film to be fed generally indicated by the letter $a$ has a straight edge $b$ and a notched edge $c$. The notches $d$ shown in Figs. 1 and 3 are semicircular in shape. The notch $d$ shown in Fig. 2 is almost semicircular in shape, but has its corners rounded off at $e$ where they join the intermediate straight portions of the edge $c$ of the film.

The film $a$ is supported by its edges $f$ in the usual manner, and the pictures indicated by the cross-hatched portions $g$.

The feeding member $h$ shown in Fig. 1 has an arcuate end $i$ which fits within one of the notches $d$. This feeding end has the usual motions, namely a longitudinal motion for feeding the film and a transverse motion to enter one of the notches $d$ before feeding and to leave the notch $d$ after feeding. Any suitable mechanism may be employed to give the requisite motions to the feeding member $h$, and as various forms of such mechanism are well known it has not been considered necessary to illustrate the same.

The arcuate end $i$ moves in the same plane as the film $a$, but the body $h$ of the claw may be located in a plane parallel to the plane of the film $a$, and may be bent so that its feeding end $i$ may enter and leave the notches $d$. The member $h$ is shown at the end of its feeding stroke.

The driving end $i$ presses the film $a$ laterally so that its straight edge $b$ is in contact with two guide pins $j\ j$.

As shown in Fig. 3 the feeding member $k$ is pivoted at $l$ to a rocking lever $m$ pivoted at $m^1$ and driven in any usual manner. The arcuate feeding end $i$ of the pawl $k$ is moved towards the film by means of the spring $n$. As the pawl $k$ descends it feeds the film, and as it commences to ascend it slides out of a notch $d$ until it enters the next upper notch $d$. The return movement of the pawl $k$ feeds the film downwards. In Fig. 3 the single feeding member $k$ is shown in its raised position ready to feed the film downwards. The feeding member $k$ presses the film $a$ laterally so that its straight edge $b$ is in contact with the two guide pins $j\ j$.

What I claim as my invention is:—

1. Improved means for feeding in a right line strip films formed with one straight edge and arcuate notches in the opposite edge, having in combination a single feeding member located at the side of the notched edge and having a reciprocating longitudinal motion, a single arcuate feeding end on said feeding member entering and leaving the said notches and moving in the same plane as that in which the film is moved and a plurality of stationary guiding members against which the straight edge of the film is pressed by the reciprocating feeding member.

2. Improved means for feeding in a right line strip films formed with one straight edge and arcuate notches in the opposite edge, having in combination a single feeding member located at the side of the notched edge and having a reciprocating longitudinal motion, a single arcuate feeding end on said feeding member entering and leaving the said notches and moving in the same plane as that in which the film is moved, and two stationary guide pins against which the film is pressed by the feeding member, said stationary guide pins being separated by a greater distance than that through which the film is fed at each stroke of the reciprocating feeding member.

ARTHUR SAMUEL NEWMAN.